United States Patent
Stelzmann et al.

(10) Patent No.: US 12,298,206 B2
(45) Date of Patent: May 13, 2025

(54) METHOD FOR FILLING AND/OR CLEANING THE MEASUREMENT CELL OF A MEASURING INSTRUMENT AND MEASURING INSTRUMENT

(71) Applicant: Anton Paar GmbH, Graz-Strassgang (AT)

(72) Inventors: Dieter Stelzmann, Hofstätten an der Raab (AT); Harald Schmidegg, Raaba-Grambach (AT)

(73) Assignee: Anton Paar GmbH, Graz-Strassgang (AT)

( * ) Notice: Subject to any disclaimer, the term of this patent is extended or adjusted under 35 U.S.C. 154(b) by 129 days.

(21) Appl. No.: 18/087,901

(22) Filed: Dec. 23, 2022

(65) Prior Publication Data

US 2023/0204467 A1 Jun. 29, 2023

(30) Foreign Application Priority Data

Dec. 23, 2021 (AT) ................ A51045/2021

(51) Int. Cl.
*G01N 1/00* (2006.01)
*B08B 3/04* (2006.01)
(Continued)

(52) U.S. Cl.
CPC ............. *G01N 1/14* (2013.01); *B08B 3/04* (2013.01); *G01N 9/34* (2013.01); *G01N 2001/002* (2013.01); *G01N 2001/1463* (2013.01)

(58) Field of Classification Search
CPC ...... G01N 1/14; G01N 9/34; G01N 2001/002; G01N 2001/1463; G01N 2011/0006;
(Continued)

(56) References Cited

U.S. PATENT DOCUMENTS

| 2,382,979 A | 8/1945 | Demb |
| 4,534,210 A | 8/1985 | Reeves |
| 10,036,695 B2 | 7/2018 | Belitsch et al. |

FOREIGN PATENT DOCUMENTS

| AT | 406425 B8 | 7/2000 |
| AT | 516058 B1 | 2/2016 |

(Continued)

*Primary Examiner* — Robert R Raevis
(74) *Attorney, Agent, or Firm* — Laurence A. Greenberg; Werner H. Stemer; Ralph E. Locher

(57) ABSTRACT

A method for fills and/or cleans the measurement cell of a measuring instrument, namely a viscometer and/or density measuring instrument, in particular of a rotational viscometer. A sample is introduced via a sample line into the measurement cell by a pump, and wherein a dynamic viscosity and/or density of the sample is determined in the measurement cell. A funnel-shaped, reversibly openable receiving container, in particular a filling funnel, for the sample, is arranged in the sample line, between the pump and the measurement cell. The receiving container is opened and the sample is introduced into the receiving container. The receiving container is connected to the pump via a pressure line in such a way that, when pressure is applied into the receiving container, a proportion of the sample is dispensed out of the receiving container and introduced into the measurement cell.

19 Claims, 3 Drawing Sheets

(51) Int. Cl.
*G01N 1/14* (2006.01)
*G01N 9/34* (2006.01)

(58) Field of Classification Search
CPC .......... G01N 9/00; G01N 35/10; G01N 11/14; G01N 1/36; G01N 11/00; B08B 3/04; B08B 9/0804
USPC .......... 73/54, 433, 434, 54.01, 54.02, 54.23, 73/54.28–54.34, 54.37, 54.39, 54.43, 73/61.59, 64.56, 863.01, 863.11
See application file for complete search history.

(56) References Cited

FOREIGN PATENT DOCUMENTS

| | | | | |
|---|---|---|---|---|
| CA | 1223458 | A | 6/1987 | |
| CN | 110777798 | A | 2/2020 | |
| CN | 111855378 | A * | 10/2020 | ............ B01D 36/00 |
| CN | 211637596 | U | 10/2020 | |
| CN | 112723481 | A * | 5/2021 | |
| CN | 113495040 | A | 10/2021 | |
| GB | 2129144 | A | 5/1984 | |
| JP | 3652575 | B2 * | 5/2005 | |
| JP | 2007003437 | * | 1/2007 | |
| JP | 6952083 | B2 * | 10/2021 | ............ H01J 49/066 |
| RU | 2286134 | C1 * | 10/2006 | |

\* cited by examiner

METHOD FOR FILLING AND/OR CLEANING THE MEASUREMENT CELL OF A MEASURING INSTRUMENT AND MEASURING INSTRUMENT

CROSS-REFERENCE TO RELATED APPLICATION

This application claims the priority, under 35 U.S.C. § 119, of Austria Patent Application AT A51045/2021, filed Dec. 23, 2021; the prior application is herewith incorporated by reference in its entirety.

FIELD AND BACKGROUND OF THE INVENTION

The invention relates to a method for filling and/or cleaning the measurement cell of a measuring instrument, in particular of a viscometer and/or of a density measuring instrument, according to the preamble of the independent method patent claim, and also to a measuring instrument according to the preamble of the independent measuring instrument patent claim.

Various apparatuses for determining the viscosity of a liquid are known from the prior art.

Rotational viscometers determine the viscosity from the equilibrium that arises during the concentric relative rotation of a measuring body and of a measuring cup containing the investigated liquid. Measuring instruments whose core element is a hollow cylinder which is filled with the liquid to be measured and in which a measuring part is located concentrically in the liquid are thus known.

According to the Searle principle, the measuring part is rotated in the stationary cup by means of a drive and the prevailing torque is measured by way of the power consumption of the rotational motor or by way of the path difference of the measuring parts, for example using resilient elements, and evaluated with regard to the viscosity of the fluid.

According to the Couette principle, the inner measuring part is taken along by the rotating outer measuring cup and the co-rotated liquid, and here, too, the corresponding measured variables, e.g.: rotational speed, torque, rotation angle, etc., are evaluated with regard to the viscosity.

A modified Couette principle is known, for example, from Austrian patent AT 516 058 B1, corresponding to U.S. Pat. Nos. 10,874,844, 10,130,750, 10,036,695, 9,314,608, 8,377,011, and 8,034,035. Here, a rotatable outer hollow cylinder is filled with the liquid to be investigated and a measuring cylinder, which is rotatably mounted in this liquid, is co-rotated by the investigated liquid during the rotation of the outer hollow cylinder.

Rotational viscometers with rotating and/or stationary measuring cups can be embodied such that continuous filling and/or cleaning of the measurement cell is possible. Arrangements that allow the measurement sample to be conducted through the measurement cell in an automated manner and the measurement system, consisting of measurement cell, sample removal apparatus and supply and discharge lines, to be cleaned can enable automated procedures by way of what are known as samplers and sample removal apparatuses and cleaning stations. Such automated rotational viscometers, which can be filled continuously, are by way of example the applicant's SVM viscometers and are known, for example, from Austrian patents AT 406 425 B8 (corresponding to U.S. patent publication No. 2007/0190318) and AT 516 058 A1.

After a measurement of a sample, the measurement cell or the entire measurement system, that is to say measurement cell plus supply and discharge lines of the measuring instrument, has to be cleaned of residues of the measured sample. The combination of a measuring instrument with an automatic sampler having cleaning function makes this task possible without manual intervention. However, in order to reliably ensure an automatic cleaning function, the sample changer or sampler has to be programmed in advance and for example the number of cleaning cycles and the length of the drying time after the measurement of a sample have to be specified. These parameters are, however, greatly dependent on the sample itself and the interaction between the sample and the cleaning agent or solvent. If the number of cleaning cycles, the duration of the cleaning operation or the drying time is incorrectly selected, residues of the sample remain in the measurement cell or the measuring instrument, or the cleaning time is selected to be too long and resources and measurement time are wasted as a result.

A disadvantage of the apparatuses and measurement methods known from the prior art is also that, when repeating the measurements, the samples in each case have to be removed for example by means a sampler tube or an ampoule and introduced into the measurement cell. This also necessitates, as described above, a time-consuming cleaning operation and therefore prolongs the measurement duration in the case of repeated measurements of uniform samples considerably.

SUMMARY OF THE INVENTION

It is therefore an object of the present invention to provide a method which makes it possible to determine the viscosity and/or the density of a sample in a simple, automated and reproducible manner, this reducing the measurement duration considerably.

With the foregoing and other objects in view there is provided, in accordance with the invention, a method for filling and/or cleaning a measurement cell of a measuring instrument. The method includes the steps of: introducing a sample via a sample line into the measurement cell by a pump; disposing a funnel-shaped, reversibly openable receiving container for the sample in the sample line, between the pump and the measurement cell; and opening the funnel-shaped, reversibly openable receiving container so that the sample is introduced into the funnel-shaped, reversibly openable receiving container. The funnel-shaped, reversibly openable receiving container is connected to the pump via a pressure line such that, when pressure is applied into the funnel-shaped, reversibly openable receiving container, a proportion of the sample is dispensed out of the funnel-shaped, reversibly openable receiving container and is introduced into the measurement cell.

This object is achieved by the characterizing features of the independent method claim. In this case, provision is made for an in particular funnel-shaped, reversibly openable receiving container, in particular a filling funnel, for the sample to be arranged in the sample line, between the pump and the measurement cell, wherein the receiving container is opened and the sample is introduced into the receiving container, wherein the receiving container is connected to the pump via a pressure line in such a way that, when pressure is applied into the receiving container, a proportion of the sample is dispensed out of the receiving container and introduced into the measurement cell.

The method according to the invention makes it possible to ensure a repeated supply of a predetermined proportion of the sample into the measurement cell in a simple manner, without it being necessary to clean the sample line or the measurement cell between the individual measurements. Furthermore, the arrangement according to the invention permits a particularly simple supply of the sample into the measurement cell and can therefore be carried out even by personnel with little training. The introduction of the sample into the measurement cell by means of the pump also means that the pressure in the receiving container and thus in the measurement cell can be reproduced in a simple manner or can be kept constant by the pump in a simple manner.

Particularly advantageous embodiments of the method according to the invention are defined in greater detail by the features of the dependent claims.

Provision may advantageously be made for the receiving container to have a pump connection and a sample outlet, wherein the pump connection is arranged above the sample column and/or the sample outlet in the direction of gravitational force, in particular in the cover of the receiving container. The pump is an air pump and air is introduced via the pump and the pressure line into the receiving container and an in particular defined pressure is applied to the sample in the receiving container. As a result of the pressure in the receiving container, the sample is introduced via the sample outlet into the sample line and the measurement cell.

Owing to the fact that the inlet of the pressure line into the receiving container is arranged above the sample outlet, an air space is formed in the upper region of the receiving container, and therefore the air supplied by the pump exerts pressure on the sample and dispenses the sample out of the sample outlet into the measurement cell, without the pump or the pressure line coming into contact with the sample itself.

In order to be able to perform a repeated measurement of a relatively large quantity of samples, provision may be made for a sample dispensing line to be arranged coming out of the measurement cell and to be used to dispense the sample out of the measurement cell, in particular into a waste container. At least one valve is arranged in the sample dispensing line and/or the measurement cell and can be used to close the sample dispensing line, this interrupting the flow of the sample in the sample line to the measurement cell and/or out of the measurement cell in the sample dispensing line when the desired fill quantity of the sample in the measurement cell has been reached. Due to the fact that the sample in the measurement cell can be dispensed out of the sample dispensing line and new sample material is introduced via the receiving container into the measurement cell, it is thus possible for a relatively large quantity of sample material or the measurement to be repeated multiple times in a simple manner, without it being necessary to clean the measurement cell or the measuring instrument in a time-consuming manner.

Provision may advantageously be made for at least one sensor, the state of which is supplied to a control unit, to be arranged in the sample dispensing line, wherein the presence of the sample in the sample dispensing line and/or measurement cell is detected by means of the sensor, wherein in particular when the sample is detected by the sensor, the pump is switched off and/or the valve is closed. The arrangement of the sensor in the sample dispensing line makes it possible to detect whether the sample has already passed through or reached the measurement cell in a simple manner, and in this way the measurement of the sample can be performed in an automated manner. The sensor in the sample dispensing line also makes it possible to ensure that the measurement cell is completely filled with the sample, and measurement errors are avoided.

In order to be able to clean the measurement cell, the sample line and the sample dispensing line in a simple manner, it may be provided that, after the measurement, the measurement cell and/or the sample line and/or the receiving container and/or the sample dispensing line is freed of residues of the sample by a cleaning agent which is introduced in particular via the receiving container. After the cleaning, air is pumped through the measurement cell and/or the sample line and/or the receiving container and/or the sample dispensing line by means of the pump in order to dry said measurement cell and/or sample line and/or receiving container and/or sample dispensing line.

In order to acquire further data about the sample, provision may be made for two sensors, in particular light barriers, to be arranged in the sample line or the sample dispensing line. The time required for the sample to pass from the first sensor to the second sensor is measured and used as a basis to deduce the flow behavior of the sample.

Advantageously, the method according to the invention makes it possible to perform the measurement multiple times. It may particularly advantageously be provided that, after a first measurement in the measurement cell, the already measured sample is dispensed out of the measurement cell by the pump, wherein a further quantity of the sample is then introduced via the receiving container into the measurement cell by means of the pump and the measurement is performed again, wherein in particular the exchange of the sample and the measurement is performed multiple times.

In order to be able to calculate the quantity of the sample needed to fill the measurement cell in a simple manner, it may be provided that the time required for the sample to fill the measurement cell is ascertained by way of a mathematical model. The mathematical model takes account of the temperature of the sample and/or of the measurement cell, and in this way, in particular repeatedly, a defined quantity of the sample is introduced into the measurement cell.

Since the sample has to be brought to a predefined temperature for some measurements of the viscosity and/or density, provision may advantageously be made for a temperature-control unit to be provided which is used to heat or cool the sample in the receiving container to a defined temperature. The temperature-control unit makes it possible to set the temperature of the sample in a particularly simple manner, this making it possible to ensure that there is always the same temperature of the samples or the same conditions for the measurement, particularly when repeating the measurement multiple times.

Since there may be suspended solids or abrasion particles in the oil or the sample, particularly when measuring used oil, such particles may have a negative influence on the reproducibility or accuracy of the measurement. In order to prevent the particles from flowing into the measurement cell, provision may advantageously be made for a magnetic unit, in particular an electromagnet or permanent magnet, to be arranged in particular in the region of the receiving container and to be used to separate out magnetic particles in the sample, this preventing the magnetic particles from entering the measurement cell.

A further aspect of the invention is to provide a measuring instrument which can be used to measure samples in a simple manner and with recurring, unchanging conditions without complicated handling. This object is achieved by the characterizing features of the independent measuring instrument claim. According to the invention, provision is made for an in particular funnel-shaped, reversibly closable receiving container, in particular a filling funnel, for receiving the sample to be arranged in the sample line, between the pump and the measurement cell. The sample can be introduced into the receiving container, wherein the receiving container is connected to the pump in such a way that, when pressure is applied into the receiving container by the pump, a proportion of the sample is dispensed out of the receiving container and can be introduced via the sample line into the measurement cell. Owing to the configuration of the measuring instrument according to the invention, the receiving container can be filled with the sample to be measured in a simple manner and the sample can be conveyed into the measurement cell by way of the pump.

A particularly advantageous configuration of the measuring instrument is achieved by virtue of the receiving container having a pump connection and a sample outlet. The pump connection is arranged above the sample outlet in the direction of gravitational force, in particular in the cover of the receiving container.

In order to be able to measure a further proportion of the sample, or to dispense the sample out of the measurement cell, after measurement of a first proportion of the sample, provision may advantageously be made for a sample dispensing line to be arranged downstream of the measurement cell and to be able to be used to dispense the sample out of the measurement cell, in particular into a waste container. At least one valve is arranged in the sample dispensing line and/or the measurement cell and can be used to interrupt the flow of the sample out of the measurement cell or in the sample dispensing line.

In order to be able to detect the filling of the measurement cell in a particularly simple manner, provision may advantageously be made for at least one sensor, in particular a light barrier, to be arranged in the sample dispensing line, wherein the presence of the sample in the sample dispensing line and/or the measurement cell can be detected by means of the sensor, wherein in particular when the sample is detected by the sensor, the pump can be switched off by a control unit and/or the valve is configured to be closable.

In order to be able to determine the flow behavior or other values of the sample in a simple manner, provision may be made for two sensors, in particular light barriers, to be arranged in the sample line or the sample dispensing line, wherein the measuring instrument has an evaluation unit. The time required for the sample to pass from the first sensor to the second sensor can be ascertained by means of the evaluation unit in order to determine the flow behavior of the sample.

As already described above in relation to the method, a repeated measurement can be performed in a particularly simple manner by virtue of the measuring instrument having a control unit. The control unit is configured in such a way that, after a measurement in the measurement cell, the already measured sample can be dispensed out of the measurement cell by the pump and a further defined, precise quantity of the sample can be introduced via the receiving container into the measurement cell by means of the pump, and the measurement can thus be carried out multiple times in succession in a repeatable manner.

The temperature of the sample can be set in a particularly simple manner by virtue of the measuring instrument having a temperature-control unit which is arranged in the region of the receiving container or around the receiving container and which can be used to heat or cool the sample in the receiving container to a defined temperature.

In order to be able to remove any suspended solids or metallic particles from the sample or be able to prevent them from flowing into the measurement cell, provision may be made for a magnetic unit, in particular an electromagnet or a permanent magnet, to be arranged in particular in the region of the receiving container and to be able to be used to separate out magnetic particles in the sample and/or retain said magnetic particles in the receiving container.

In order to be able to fill the receiving container with further samples or the cleaning agent in a simple manner, provision may be made for a pressure release valve to be connected in or to the receiving container, with the result that pressure can be released from the receiving container. The pressure release valve is arranged in particular in the region of the cover of the receiving container or the pressure line.

Other features which are considered as characteristic for the invention are set forth in the appended claims.

Although the invention is illustrated and described herein as embodied in a method for filling and/or cleaning a measurement cell of a measuring instrument, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
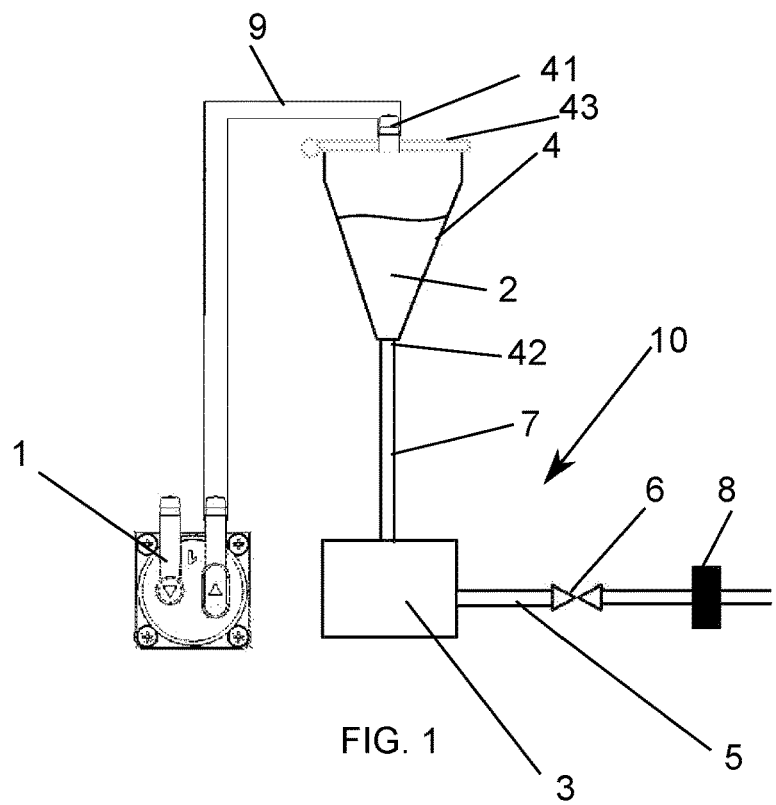
FIG. 1 is a schematic illustration of a first embodiment of the measuring instrument according to the invention.

Referring now to the figures of the drawings in detail and first, particularly to FIG. 1 thereof, there is shown schematically a first embodiment of the measuring instrument 10 according to the invention. The measuring instrument 10 comprises a pump 1 which is connected to a receiving container 4 via a pressure line 9. A sample 2, the viscosity and/or density of which is intended to be determined in the measuring instrument 10, is introduced in the receiving container 4. In the embodiment in FIG. 1, the receiving container 4 is funnel-shaped or in the form of a filling funnel. The receiving container 4 contains a cover 43 which can be opened in a reversible manner and via which the sample 2 can be introduced into the receiving container 4. The measuring instrument 10 also has a measurement cell 3 in which the viscosity and/or density is measured. The measurement cell 3 is connected to the receiving container 4 via a sample line 7. A sample outlet 42, to which the sample line 7 is connected, is arranged at that end of the receiving container 4 which tapers in a funnel-like manner. The receiving container 4 also has a pump connection 41 which is arranged in the cover 43 of the receiving container 4. As an alternative, the pump connection 41 may also be arranged in the receiving container 4. The pressure line 9 is arranged on the pump connection 41 and thus connects the receiving container 4 to the pump 1. In this embodiment, the sample outlet 42 of the receiving container 4 is arranged at the bottom end of the funnel-shaped receiving container 4, and therefore the pump connection 41 is arranged above the sample column in the direction of gravitational force, that is to say above the sample 2 which is introduced in the receiving container 4, and likewise above the sample outlet 42 in the direction of gravitational force.

In the embodiment in FIG. 1, the pump 1 is in the form of an air pump, and therefore the pump 1 conveys air via the pressure line 9 and the pump connection 41 into the receiving container 4. As a result of the air entering the receiving container 4 above the sample column or above the sample 2, a pressure is built up in the receiving container 4 and the sample 2 is then introduced via the sample line 7 into the measurement cell 3. The viscosity and/or the density of the sample 2 is then measured in the measurement cell 3.

The measuring instrument 10 also has a sample dispensing line 5 which is arranged downstream of the measurement cell 3 and which is used to dispense the sample 2 out of the measurement cell 3, for example into a waste container (not illustrated). A valve 6 is arranged in the sample dispensing line 5 and can be used to close the sample dispensing line 5. It is thus for example possible for the valve 6 to be closed when the desired fill quantity of the sample 2 in the measurement cell 3 has been reached, this making it possible to interrupt the flow of the sample 2 in the sample line 7, the sample dispensing line 5 and/or the measurement cell 3. It is optionally also possible for the valve 6 to be arranged directly in the measurement cell 3 or at the outlet thereof, this making it possible to also interrupt the flow of the sample 2 at other locations of the measuring instrument 10.

In the embodiment in FIG. 1, the measuring instrument 10 is in the form of a rotational viscometer, the measurement cell 3 being in the form of a measurement cell 3 of the rotational viscometer. It is optionally also possible for the measuring instrument 10 to be in the form of a density measuring instrument or another viscometer, wherein the measurement cell 3 may optionally also have a plurality of measurement cells 3 or measuring instruments or measuring parts, for example a rotational viscometer and a flexural resonator, for measuring the viscosity and/or density of the sample 2. It is thus for example possible for the measuring instrument to also comprise a flexural resonator for measuring the density, the measurement cell 3 of which is filled and/or cleaned in accordance with the invention. It is optionally also possible for the measurement cell 3 to be in the form of a sensor for determining the refractive index and for the refractive index to be determined in the measurement cell 3 of the measuring instrument 10 and to be used as a basis for determining the density or viscosity of the sample 2.

The measuring instrument 10 has a sensor 8 which is arranged in the sample dispensing line 5. The state or the measured values of the sensor 8 are supplied to a non-illustrated control unit, and therefore the presence of the sample 2 in the sample dispensing line 5 and/or the measurement cell 3 is detected by means of the sensor 8. The sensor 8 may be in the form, for example, of a light barrier, an inductive sensor or a capacitive sensor. If the sensor 8 registers that the sample 2 has already reached the sensor 8 and thus the measurement cell 3 is completely filled with the sample 2, the presence of the sample 2 can be detected at the sensor 8 and be forwarded to the control unit, and then for example the pump 1 can be switched off and/or the valve 6 can be closed.

Figure 2:
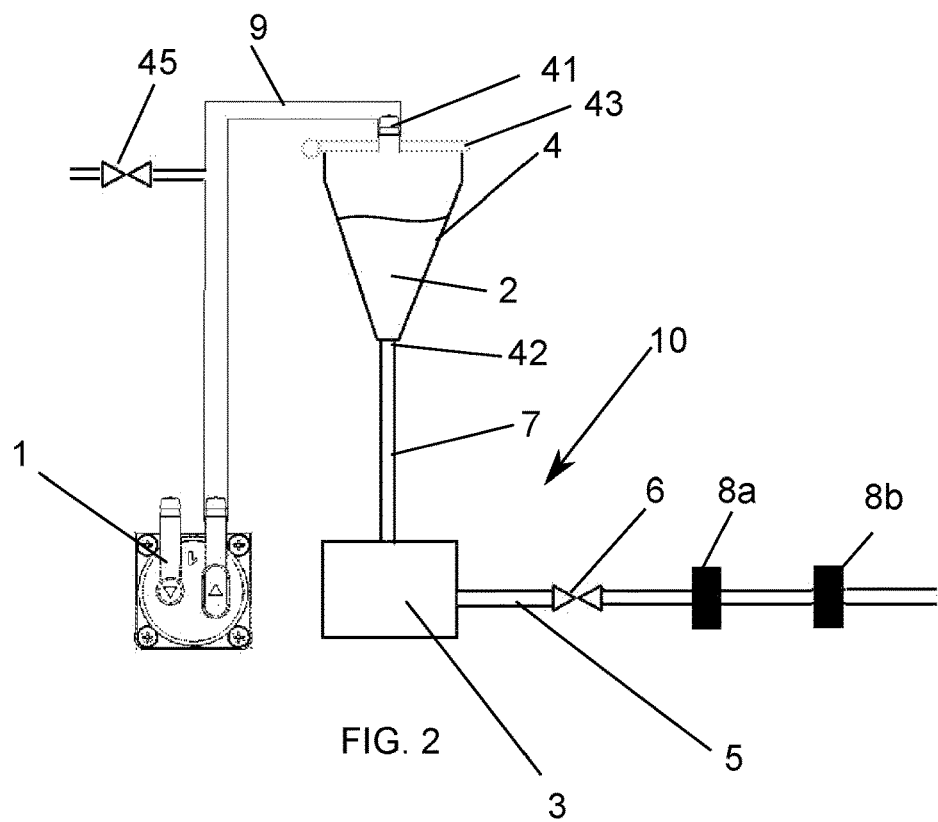
FIG. 2 is an illustration of the measuring instrument according to the invention with a pressure release valve and two sensors.

FIG. 2 shows a second embodiment of the measuring instrument 10 according to the invention. The measuring instrument 10 has, as described in relation to FIG. 1, a pump 1, a receiving container 4 and a sample line 7 and a measurement cell 3. Two sensors 8a, 8b are arranged in the sample dispensing line 5 of the embodiment in FIG. 2. The two sensors 8a, 8b are in particular in the form of light barriers or inductive or capacitive sensors, with the result that these can detect the sample 2 when it passes through the sensors 8a, 8b. The sensors 8a, 8b are connected to the control unit, and therefore, when the sample 2 passes through the respective sensor 8a, 8b, this is forwarded to the control unit. Owing to the arrangement of the first sensor 8a upstream of the second sensor 8b in the sample dispensing line 5, it is for example possible for the time required for the sample 2 to flow from the first sensor 8a to the second sensor 8b to be measured and to be used as a basis to determine the flow behavior of the sample 2 or deduce the flow behavior.

The measuring instrument 10 in FIG. 2 also has a pressure release valve 45 which is arranged in the pressure line 9 or connected thereto. The pressure in the receiving container 4, which has been applied by way of the pump 1, can be released via the release valve 45, this making it easier to refill the filter or the receiving container 4 with the sample 2. It is optionally also possible for the pressure release valve 45 to be arranged in other regions of the measuring instrument 10, for example in the cover 43 of the receiving container 4 or in the upper region of the receiving container 4 above the sample column.

In the following, the method according to the invention is described by way of example on the basis of the preferred embodiment in FIG. 2.

At the beginning, the cover 43 of the receiving container 4 is opened and the receiving container 4 is filled with the sample 2, the density and/or viscosity of which is intended to be determined. The receiving container 4 or the cover 43 is then closed again, such that this is in particular hermetically sealed in relation to the environment. Air is then introduced via the pump 1 and the pressure line 9 into the upper part of the receiving container 4 above the sample column and the pressure in the receiving container 4 increases. Owing to the increase in the pressure in the receiving container 4, the sample 2 is introduced via the sample line 7 into the measurement cell 3. If the sample 2 has now reached the measurement cell 3, the valve 6 is closed and the flow of the sample 2 is interrupted. Then, the measurement of the sample 2 is performed in the measurement cell 3 and the density and/or viscosity of the sample 2 is determined. After the measurement has ended, the valve 6 can be opened again and the pump 1 can apply more pressure via the receiving container 4 and the sample line 7, with the result that the sample 2 is dispensed out of the measurement cell 3 in the sample dispensing line 5. As illustrated in FIG. 2, the sample can then pass through the first sensor 8a and the second sensor 8b, this making it possible to deduce the flow properties or the flow rate of the sample 2. If the measurement of the density and/or viscosity is intended to be carried out multiple times, it is for example possible, after the first measurement, for the already measured sample 2 to be dispensed out of the measurement cell 3 via the sample dispensing line 5 and for a fresh or further sample 2 present in the receiving container 4 to be introduced via the pump 1 and the sample line 7 into the measurement cell 3. As soon as the desired quantity of the sample 2 has again been introduced in the measurement cell 3, the valve 6 closes again and the measurement is repeated in the measurement cell 3. This makes it possible to perform a measurement, which is effected multiple times in succession, of the sample 2 or of individual defined quantities of the sample 2 in an automated manner. The handling is thereby simplified and measurement series, which require a repeated measurement of the samples 2 or the measurement of a large quantity of samples 2, can be carried out in an automated and thus simple manner, and even by personnel with little training.

As an alternative to the embodiments of the measuring instrument 10 which are illustrated in FIGS. 1 and 2, the sensor 8 or the sensors 8a, 8b may also be arranged upstream of the valve 6 in the sample dispensing line 5 or may also be arranged in the sample line 7 or directly at the outlet of the measurement cell 3.

Figure 3:
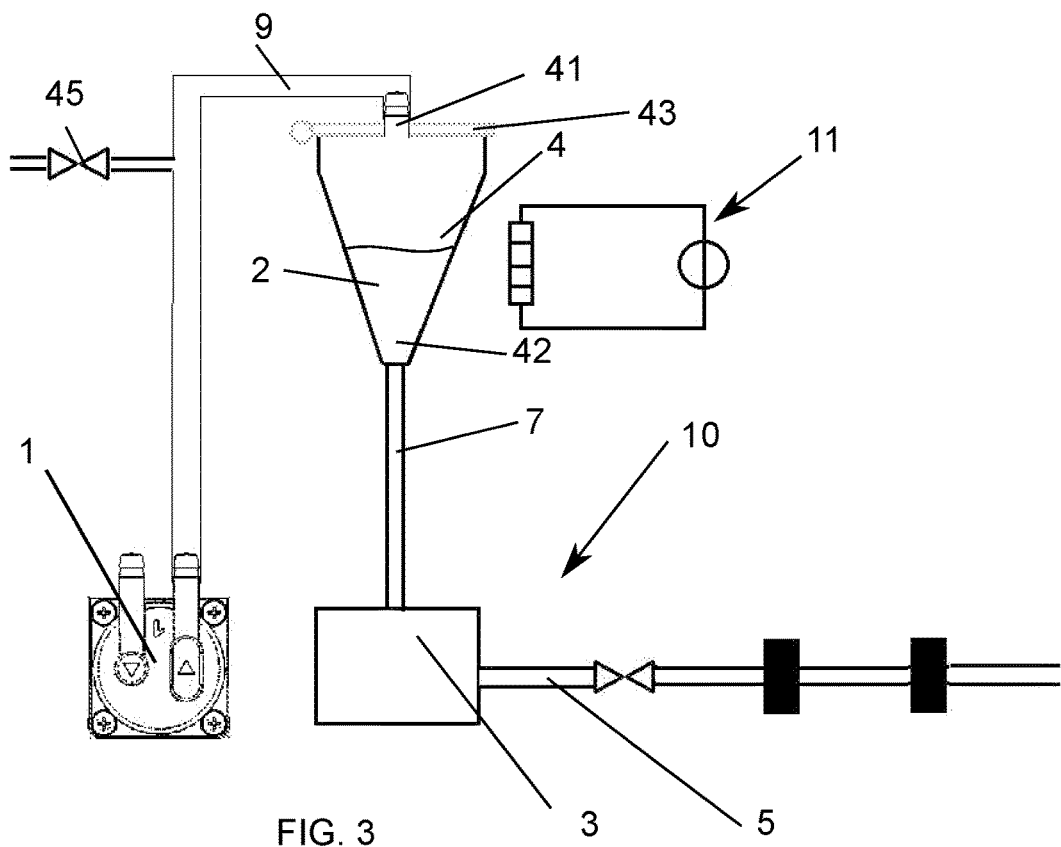
FIG. 3 is an illustration of a further embodiment of the measuring instrument according to the invention with a temperature-control unit.

FIG. 3 illustrates a further embodiment of the measuring instrument 10 according to the invention. In this embodiment, the measuring instrument 10 has a temperature-control unit 11 which is arranged in the region of the receiving container 4. The temperature of the sample 2 in the receiving container 4 can be set by way of the temperature-control unit 11, and thus the flow behavior of the sample 2 and the temperature thereof can be specified in a defined manner. The temperature-control unit 11 makes it possible to heat or cool the sample 2 and to always provide the same conditions for the measurement of the sample 2 in the measurement cell 3. As an alternative to the embodiment illustrated in FIG. 3, the temperature-control unit 11 may also be arranged completely around the receiving container 4 and may also influence the sample line 7 and/or the measurement cell 3, with the result that a constant temperature can be set therein.

Figure 4:
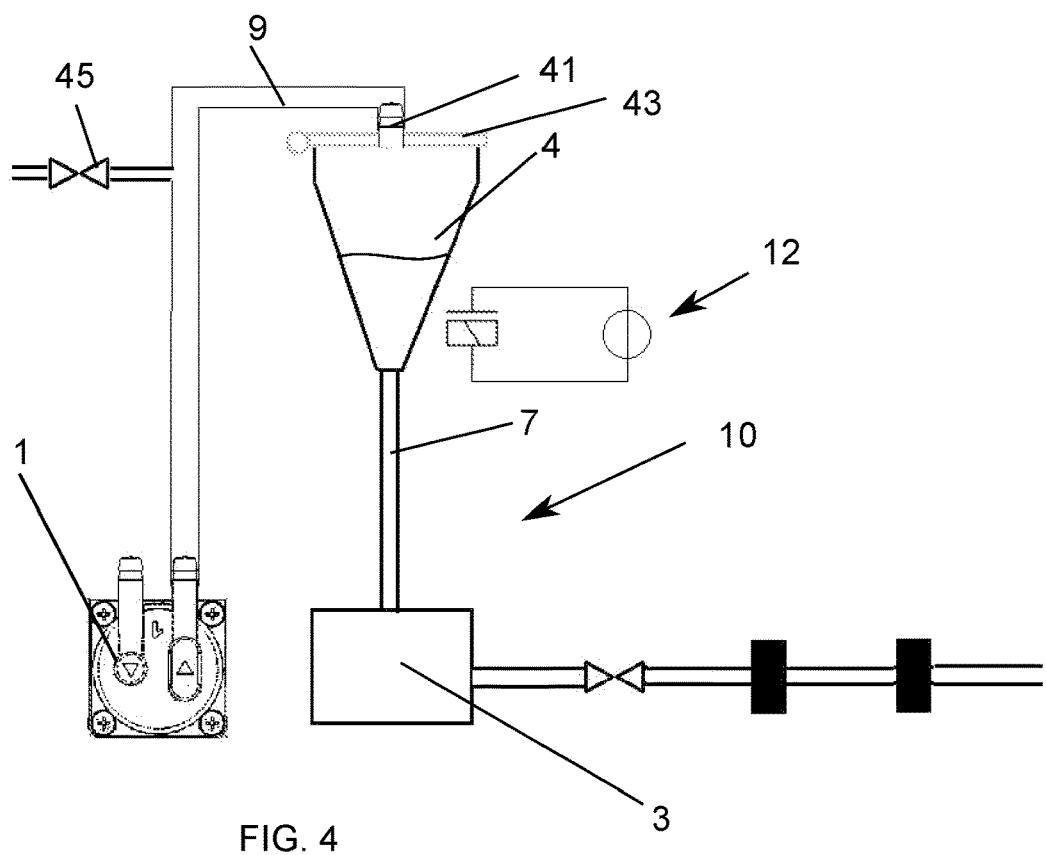
FIG. 4 is an illustration of one embodiment of the measuring instrument with a magnetic unit.

FIG. 4 schematically depicts a further embodiment of the measuring instrument 10 according to the invention. In this embodiment, the measuring instrument 10 has a magnetic unit 12 in the form of an electromagnet which is arranged in the region of the filling funnel or the receiving container 4. The magnetic unit 12 produces a magnetic trap in the region of the receiving container 4, with the result that any suspended particles located in the sample 2 can be prevented from exiting the receiving container 4 by the magnetic unit 12 or can be trapped in the region of the magnetic unit 12. In particular, in the case of used oils, magnetic abrasion parts that frequently appear can be trapped in this way, and a negative influence on the measurement or the entry of the abrasion parts into the measurement cell 3 can be prevented.

A preferred embodiment of the method according to the invention provides that, after the measurement of the sample 2 in the measurement cell 3, a cleaning agent is introduced into the receiving container 4 and the cleaning agent is transported into the sample line 7, the measurement cell 3 and the sample dispensing line 5 by means of the pump 1. The cleaning agent is then pumped through all the parts of the measuring instrument 10 by means of the pump 1 and a reliable and simple cleaning of the measurement cell 3 and of the parts of the measuring instrument 10 is achieved. Owing to the configuration of the pump 1 as an air pump, air can then be introduced via the pressure line 9, the receiving container 4 and the sample line 7 into the measurement cell 3 and residues of the cleaning agent can be blown out via the sample dispensing line 5 or the individual parts of the measuring instrument 10 can be dried. Furthermore, owing to the configuration of the pump 1 as an air pump, it is possible to build up pressure within the measuring instrument 10, with the result that the sample 2 or the residues thereof are blown out for example by opening and closing the valve 6 in a pulsed manner. It is for example also possible for particles which are present in the receiving container 4 and which have been trapped by the magnetic unit 12 to be pressed out or blown out of the receiving container 4 and the sample dispensing line.

As an alternative, instead of configuring the pump 1 as an air pump, it is also possible for other gases or protective gases to be conveyed into the receiving container 4 by means of the pump and thus for the required pressure to be built up.

It is optionally also possible for the quantity of the sample 2 introduced into the measurement cell 3 to be ascertained by way of a mathematical model. The mathematical model or may advantageously take account of the temperature of the sample 2 and/or of the measurement cell 3, and therefore a calculated, defined quantity of the sample 2 is introduced into the measurement cell 3. It is thus possible for the period of time for which the valve 6 is open or the period of time for which the pump 1 is switched on to be adapted to the results of the mathematical model.

Figure 5:
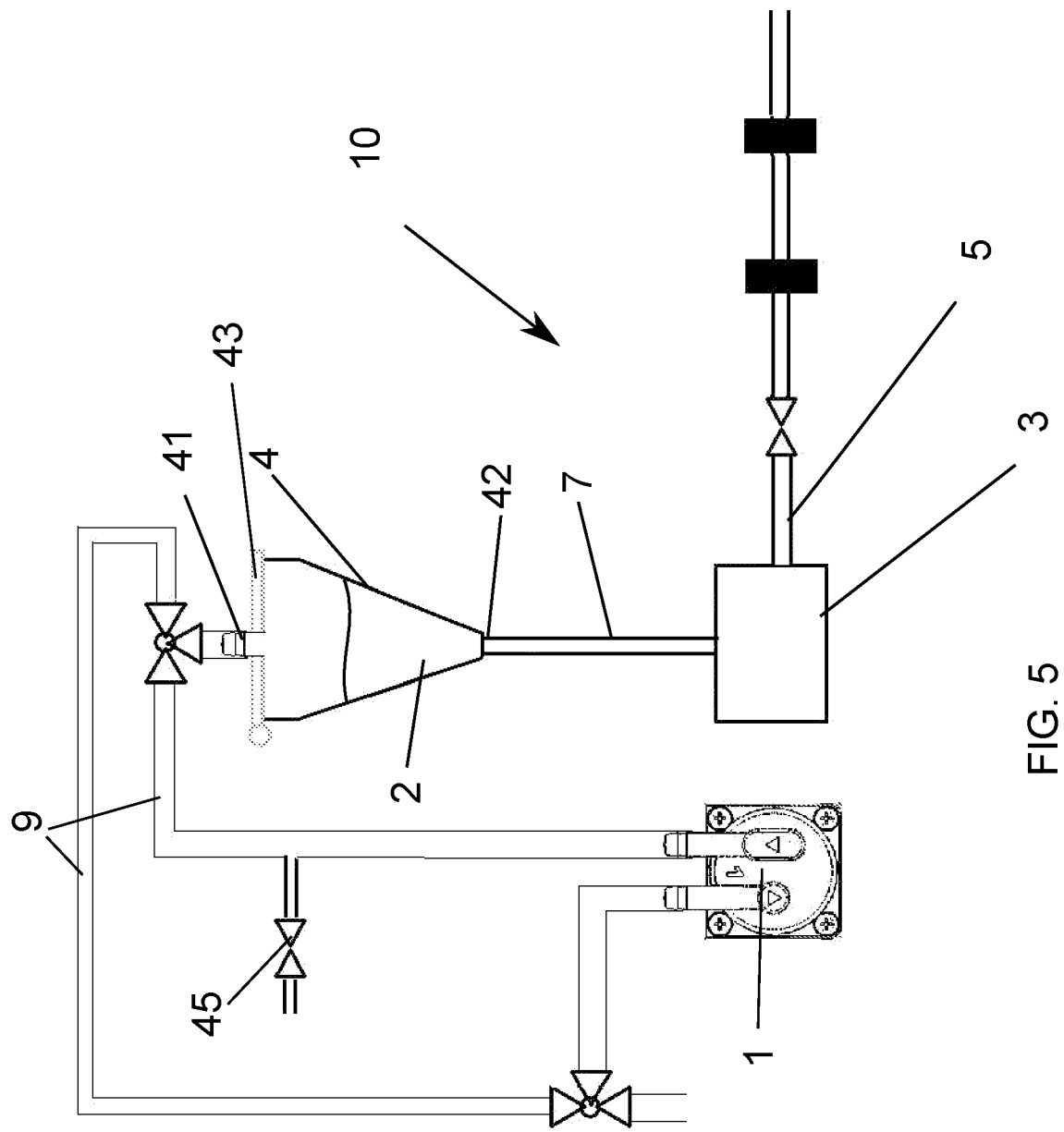
FIG. 5 is an illustration of one embodiment of the measuring instrument according to the invention with various pressure lines.

FIG. 5 depicts a further optional embodiment of the measuring instrument according to the invention. A plurality of pressure lines 9 are arranged on the pump, with the result that these can direct the flow of air out of the pump 1 differently for example by way of multi-way valves. It is thus for example possible, by different switching of the valves, for the air and thus the pressure in the receiving container 4 to be changed and for example for a positive pressure and negative pressure to be generated in an alternating manner, such that the sample 2 is sucked or pushed into the lines, and thus the flow direction and the pressure ratios in the measurement cell 3 can also be changed and set.

As an alternative to the funnel-shaped configuration of the receiving container 4 in FIGS. 1 to 5, any other shapes, whether angular or round, are conceivable, wherein for example a rectangular basic shape having a downwardly tapering funnel shape is also encompassed within the meaning of the invention.

It is optionally possible for the quality of the flushing operation and the cleanness of the measurement cell 3 or of the measurement system or of the measuring instrument 10 of the present invention to be determined even more effectively in one embodiment that is not illustrated if, in addition to the viscosity of the cleaning agent flowing through the measurement cell 3, at least one further physical parameter of the sample 2 and/or of the cleaning liquid is determined during operation. It is for example possible for a further parameter for the viscosity, the density, the refractive index and/or the turbidity of the cleaning agent passing through the measurement cell 3 to be measured by at least one measuring unit which is additionally arranged in the measurement cell 3 and/or a measuring unit which is mounted downstream of the measurement cell 3 or a further measuring instrument 10. The measured viscosity and/or the measured density and/or the measured refractive index and/or the measured turbidity can then be used to make a statement regarding the cleanness of the measuring instrument 10 or of the measurement cell 3. To this end, the at least one further measuring instrument is preferably mounted downstream of the measurement cell 3 of the measuring instrument 10, but may also be mounted upstream or downstream where necessary by changing of the flushing or throughflow direction. It is for example possible for a viscometer to be combined with a density measuring instrument, as is described, for example, in international patent disclosure WO 2020124111 or Austrian patent application AT 522 151 A1 (corresponding to U.S. patent publication No. 2009/0061068).

As an alternative to the configuration as a rotational viscometer described in the embodiments, the measuring instrument itself may also be in the form of a density measuring instrument, for example in the form of a flexural resonator. Or the combination, as mentioned above, of a viscometer and a density measuring instrument or a flexural resonator may be configured with in each case two separate measurement cells 3. It is thus optionally possible to use the flexural resonator or the density measuring instrument to determine the density of the medium passing through the measurement cell 3 or of the sample 2 which passes through.

As an alternative, provision may be made for a further measurement cell 3 or a further measuring unit of the measurement cell 3 to be mounted upstream or downstream in the measuring instrument 10 or upstream or downstream of the measuring instrument 10 and for the turbidity and/or the refractive index of the medium passing through the measurement cell 3 or of the sample 2 which passes through to be determined by means of this measuring unit. Such measuring instruments which ascertain the turbidity of a liquid are based on the weakening of the intensity of light radiation when passing through a fluid medium. The degree of turbidity is ascertained as a result of scattering of the light radiation on particles located in the medium, and is determined in known commercially available systems by measurement of the attenuation in transmission or measurement of the scattered light in a lateral arrangement.

The invention claimed is:

1. A method for filling and/or cleaning a measurement cell of a measuring instrument, which comprises the steps of:
   introducing a sample via a sample line into the measurement cell by a pump;
   disposing the sample line and a funnel-shaped, reversibly openable receiving container for the sample between the pump and the measurement cell; and
   opening the funnel-shaped, reversibly openable receiving container so that the sample is introduced into the funnel-shaped, reversibly openable receiving container, wherein the funnel-shaped, reversibly openable receiving container is connected to the pump via a pressure line such that, when pressure is applied into the funnel-shaped, reversibly openable receiving container, a portion of the sample is dispensed out of the funnel-shaped, reversibly openable receiving container and is introduced into the measurement cell.

2. The method according to claim 1, wherein:
   the funnel-shaped, reversibly openable receiving container has a pump connection and a sample outlet, wherein the pump connection is disposed above a sample and/or the sample outlet in a direction of gravitational force;
   the pump is an air pump and air is introduced via the pump and the pressure line into the funnel-shaped, reversibly openable receiving container; and
   as a result of the pressure in the funnel-shaped, reversibly openable receiving container, the sample is introduced via the sample outlet into the sample line and the measurement cell.

3. The method according to claim 1, wherein:
   a sample dispensing line is disposed coming out of the measurement cell and is used to dispense the sample out of the measurement cell; and
   at least one valve is disposed in the sample dispensing line and/or the measurement cell and can be used to close the sample dispensing line, resulting in an interruption in a flow of the sample in the sample line to the measurement cell and/or out of the measurement cell in the sample dispensing line when a desired fill quantity of the sample in the measurement cell has been reached.

4. The method according to claim 3, which further comprises:
   supplying a state of at least one sensor to a control unit, the at least one sensor is disposed in the sample dispensing line, wherein a presence of the sample in the sample dispensing line and/or the measurement cell is detected by means of the at least one sensor; and
   switching off the pump and/or closing the at least one valve when the sample is detected by the at least one sensor.

5. The method according to claim 4, wherein after a measurement, performing the following steps:
   freeing the measurement cell and/or the sample line and/or the funnel-shaped, reversibly openable receiving container and/or the sample dispensing line of residues of the sample by use of a cleaning agent; and
   after a cleaning, pumping air through the measurement cell and/or the sample line and/or the funnel-shaped, reversibly openable receiving container and/or the sample dispensing line by means of the pump in order to dry the measurement cell and/or the sample line and/or the funnel-shaped, reversibly openable receiving container and/or the sample dispensing line.

6. The method according to claim 4, wherein the at least one sensor includes first and second sensors disposed the sample line or the sample dispensing line, the method further comprises:
   measuring a time required for the sample to pass from the first sensor to the second sensor; and
   using the time measured as a basis to deduce a flow behavior of the sample.

7. The method according to claim 1, wherein after a first measurement in the measurement cell, an already measured sample is dispensed out of the measurement cell by the pump, wherein a further quantity of the sample is then introduced via the funnel-shaped, reversibly openable receiving container into the measurement cell by means of the pump and the measurement is performed again.

8. The method according to claim 1, wherein the measuring instrument has a temperature-control unit which is used to heat or cool the sample in the funnel-shaped, reversibly openable receiving container to a defined temperature.

9. The method according to claim 1, wherein the measuring instrument has a magnetic unit disposed in a region of the funnel-shaped, reversibly openable receiving container and is used to separate out magnetic particles in the sample, thus preventing the magnetic particles from entering the measurement cell.

10. The method according to claim 1, wherein:
    the measuring instrument is a viscometer, a density measuring instrument and/or a rotational viscometer;
    a dynamic viscosity and/or density of the sample is determined in the measurement cell; and
    the funnel-shaped, reversibly openable receiving container is a filling funnel.

11. A measuring instrument for measuring a dynamic viscosity and/or a density of a sample, the measuring instrument comprising:
    at least one measurement cell;
    a sample line;

a pump connected to said measurement cell via said sample line; and a funnel-shaped, reversibly closable receiving container for receiving the sample, said funnel-shaped, reversibly closable receiving container and said sample line disposed between said pump and said at least one measurement cell, wherein the sample can be introduced into said funnel-shaped, reversibly closable receiving container, wherein said funnel-shaped, reversibly closable receiving container is connected to said pump such that, when pressure is applied into said funnel-shaped, reversibly closable receiving container by said pump, a portion of the sample is dispensed out of said funnel-shaped, reversibly closable receiving container and introduced via said sample line into said at least one measurement cell.

12. The measuring instrument according to claim 11, wherein said funnel-shaped, reversibly closable receiving container has a pump connection and a sample outlet, said pump connection is disposed above said sample outlet in a direction of gravitational force.

13. The measuring instrument according to claim 11, further comprising:
a sample dispensing line disposed downstream of said at least one measurement cell and is used to dispense the sample out of said at least one measurement cell; and
at least one valve is disposed in the sample dispensing line and/or the at least one measurement cell and can be used to interrupt a flow of the sample out of the at least one measurement cell or in said sample dispensing line.

14. The measuring instrument according to claim 13, further comprising at least one sensor disposed in said sample dispensing line, wherein a presence of the sample in said sample dispensing line and/or said at least one measurement cell is detected by means of said at least one sensor.

15. The measuring instrument according to claim 13, further comprising:
first and second sensors disposed in said sample line or said sample dispensing line; and
an evaluation unit, wherein a time required for the sample to pass from said first sensor to said second sensor is ascertained by means of said evaluation unit to determine a flow behavior of the sample.

16. The measuring instrument according to claim 11, further comprising a controller configured such that, after a measurement in said at least one measurement cell, an already measured sample is dispensed out of said at least one measurement cell by said pump and a further defined, precise quantity of the sample can be introduced via said funnel-shaped, reversibly closable receiving container into said at least one measurement cell by means of said pump, and the measurement can thus be carried out multiple times in succession in a repeatable manner.

17. The measuring instrument according to claim 11, further comprising a temperature-control unit disposed in a region of said funnel-shaped, reversibly closable receiving container or around said funnel-shaped, reversibly closable receiving container and which is used to heat or cool the sample in said funnel-shaped, reversibly closable receiving container to a defined temperature.

18. The measuring instrument according to claim 11, further comprising a magnetic unit being used to separate out magnetic particles in the sample and/or retain the magnetic particles in said funnel-shaped, reversibly closable receiving container.

19. The measuring instrument according to claim 11, further comprising a pressure release valve being connected in or to said funnel-shaped, reversibly closable receiving container, with a result that the pressure can be released from said funnel-shaped, reversibly closable receiving container.

* * * * *